(12) United States Patent
Matsushima et al.

(10) Patent No.: US 11,994,776 B2
(45) Date of Patent: May 28, 2024

(54) LIQUID CRYSTAL PANEL AND DISPLAY DEVICE

(71) Applicant: Japan Display Inc., Tokyo (JP)

(72) Inventors: Toshiharu Matsushima, Tokyo (JP); Shunichi Kimura, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/329,642

(22) Filed: Jun. 6, 2023

(65) Prior Publication Data

US 2023/0393436 A1    Dec. 7, 2023

(30) Foreign Application Priority Data

Jun. 7, 2022   (JP) ................. 2022-092569

(51) Int. Cl.
*G02F 1/1343*   (2006.01)
*G02F 1/1333*   (2006.01)
*G02F 1/13*     (2006.01)

(52) U.S. Cl.
CPC .... *G02F 1/13439* (2013.01); *G02F 1/133345* (2013.01); *G02F 1/1323* (2013.01)

(58) Field of Classification Search
CPC ........... G02F 1/13439; G02F 1/133345; G02F 1/1323
USPC ....................................................... 349/139
See application file for complete search history.

(56) References Cited

U.S. PATENT DOCUMENTS

| 10,481,429 B2 | 11/2019 | Koyama et al. |
| 2004/0160561 A1* | 8/2004 | Koma ............... G02F 1/133753 349/125 |
| 2019/0113790 A1* | 4/2019 | Hakoi .................. G02F 1/1343 |
| 2022/0269128 A1 | 8/2022 | Matsushima |

FOREIGN PATENT DOCUMENTS

| JP | 2018-092069 A | 6/2018 |
| JP | 2021-081465 A | 5/2021 |

OTHER PUBLICATIONS

U.S. Office Action issued Jan. 5, 2024, in corresponding U.S. Appl. No. 18/328,798, 20 pages.

* cited by examiner

*Primary Examiner* — Michael H Caley
*Assistant Examiner* — William D Peterson
(74) *Attorney, Agent, or Firm* — XSENSUS LLP

(57) ABSTRACT

According to an aspect, a liquid crystal panel includes: a first substrate that is a light-transmitting substrate; a second substrate that is disposed facing the first substrate with a liquid crystal interposed between the first substrate and the second substrate and is a light-transmitting substrate; a wiring layer provided on the first substrate on a side facing the liquid crystal and comprising a plurality of wiring lines arrayed in a predetermined direction; an insulating layer stacked on the wiring layer on a side facing the liquid crystal; a first electrode layer stacked on the insulating layer on a side facing the liquid crystal; and a second electrode layer provided on the second substrate on a side facing the liquid crystal. A sheet resistance of the first electrode layer is higher than a sheet resistance of the wiring layer and a sheet resistance of the second electrode layer.

5 Claims, 5 Drawing Sheets

LIQUID CRYSTAL PANEL AND DISPLAY DEVICE

CROSS-REFERENCE TO RELATED APPLICATION

This application claims the benefit of priority from Japanese Patent Application No. 2022-092569 filed on Jun. 7, 2022, the entire contents of which are incorporated herein by reference.

BACKGROUND

1. Technical Field

What is disclosed herein relates to a liquid crystal panel and a display device.

2. Description of the Related Art

As described in Japanese Patent Application Laid-open Publication No. 2021-081465, it is known that there is a viewing angle control panel provided to a display surface of a display panel to control the viewing angle so as to inhibit an image on the display panel from being visually recognized when viewed obliquely.

When an image output from the display panel is viewed by a user from an oblique viewpoint, the inclination angle with respect to the display panel differs between the line of sight to a near side positioned relatively close to the display panel and the line of sight to a far side positioned relatively far from the display panel. Therefore, the image cannot be obliquely viewed on one of the near side and the far side but may possibly be obliquely viewed on the other side depending on the viewing angle characteristics of the viewing angle control panel.

For the foregoing reasons, there is a need for a liquid crystal panel and a display device that can more reliably inhibit an image from being visually recognized from an oblique viewpoint.

SUMMARY

According to an aspect, a liquid crystal panel includes: a first substrate that is a light-transmitting substrate; a second substrate that is disposed facing the first substrate with a liquid crystal interposed between the first substrate and the second substrate and is a light-transmitting substrate; a wiring layer provided on the first substrate on a side facing the liquid crystal and comprising a plurality of wiring lines arrayed in a predetermined direction; an insulating layer stacked on the wiring layer on a side facing the liquid crystal; a first electrode layer stacked on the insulating layer on a side facing the liquid crystal; and a second electrode layer provided on the second substrate on a side facing the liquid crystal. A sheet resistance of the first electrode layer is higher than a sheet resistance of the wiring layer and a sheet resistance of the second electrode layer.

DETAILED DESCRIPTION

Figure 1:
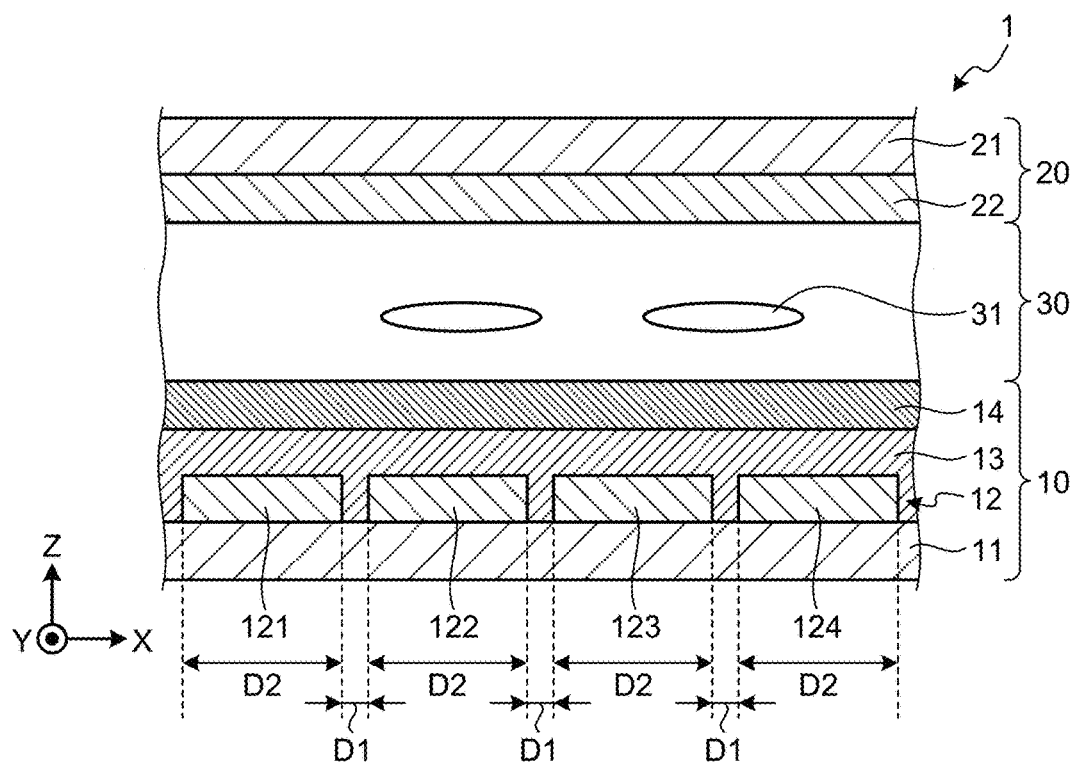
FIG. 1 is a schematic sectional view of the main configuration of a viewing angle control panel.

Exemplary embodiments according to the present disclosure are described below with reference to the accompanying drawings. What is disclosed herein is given by way of example only, and appropriate modifications made without departing from the spirit of the present invention and easily conceivable by those skilled in the art naturally fall within the scope of the present disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

FIG. 1 is a schematic sectional view of the main configuration of a viewing angle control panel 1. The viewing angle control panel 1 includes substrates 10 and 20 and a liquid crystal 30. The substrate 10 and the substrate 20 face each other with the liquid crystal 30 interposed therebetween. The liquid crystal 30 is sealed by a sealing member, which is not illustrated, provided to the outer end of the viewing angle control panel 1. In the following description, the direction in which the substrate and the substrate 20 face each other is referred to as a Z-direction. One of two directions along a plane orthogonal to the Z-direction is an X-direction, and the other is a Y-direction. The X- and Y-directions are orthogonal to each other.

The substrate 10 includes a first substrate 11, a wiring layer 12, an insulating layer 13, and a first electrode layer 14. The first substrate 11 is a light-transmitting substrate. Specifically, the first substrate 11 is a glass substrate, for example, but it may be a thin-plate substrate made of other light-transmitting materials.

The wiring layer 12 is formed on the first substrate 11 on the side facing the liquid crystal 30. The wiring layer 12 is made of light-transmitting conductive material. While the light-transmitting conductive material used for the wiring layer 12 is indium tin oxide (ITO), for example, it is not limited thereto and may be other light-transmitting conductive materials.

The wiring layer 12 includes a plurality of wiring lines arrayed in the X-direction. In FIG. 1, wiring lines 121, 122, 123, and 124 arrayed from one side to the other in the X-direction are illustrated as the wiring lines. The insulating layer 13 is interposed between the wiring lines adjacently disposed in the X-direction out of the wiring lines included in the wiring layer 12. Different wiring lines of the wiring lines included in the wiring layer 12 are insulated in the X-direction by the insulating layer 13 and do not short-circuit.

A space D1 in the X-direction where the insulating layer 13 is interposed between the wiring lines adjacently disposed in the X-direction out of the wiring lines included in the wiring layer 12 is preferably smaller within the region where the wiring lines adjacently disposed in the X-direction do not short-circuit. A width D2 in the X-direction of each of the wiring lines included in the wiring layer 12 corresponds to the arrangement pitch in the X-direction of the wiring lines including the space D1. While the width D2 is several millimeters (mm) to several centimeters (cm), for example, it is not limited thereto and can be appropriately changed.

Figure 3:
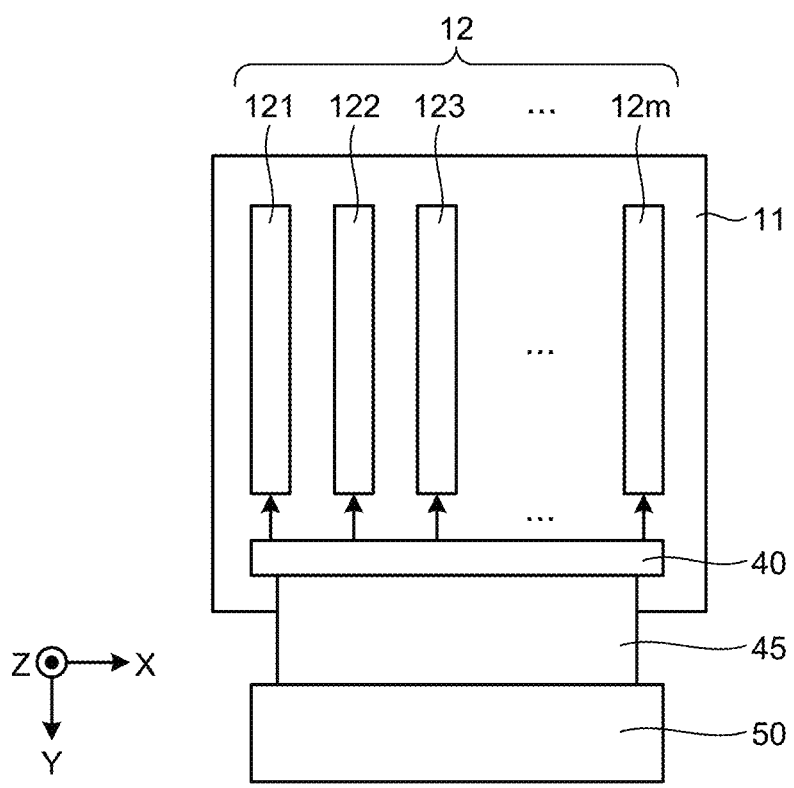
FIG. 3 is a schematic illustrating the configuration included in a wiring layer and the configuration coupled thereto.

FIG. 3 is a schematic illustrating the configuration included in the wiring layer 12 and the configuration coupled thereto. In FIG. 3, wiring lines 121, 122, 123, . . . , and 12m are illustrated as the wiring lines included in the wiring layer 12. m of the wiring line 12m corresponds to the number of wiring lines. m is a natural number. If m is 4, the wiring lines included in the wiring layer 12 is the wiring lines 121, 122, 123, and 124 illustrated in FIG. 1. In the following description, the wiring lines 121, . . . , and 12m refer to the wiring lines included in the wiring layer 12. The region in which the wiring lines 121, . . . , and 12m with the width D2 are arrayed in the X-direction with the space D1 interposed therebetween described above functions as a viewing angle control region, which will be described later. In other words, the wiring lines 121, . . . , and 12m are disposed in the region functioning as the viewing angle control region. More specifically, the "region functioning as the viewing angle control region" corresponds to the region covered by the first electrode layer 14. The wiring lines 121, . . . , and 12m faces the first electrode layer 14, whereby the region covered by the first electrode layer 14 functions as the viewing angle control region, which will be described later.

The wiring lines 121, . . . , and 12m are individually coupled to a drive circuit 40. The drive circuit 40 is a circuit that can individually apply voltages to the wiring lines 121, . . . , and 12m. The drive circuit 40 is coupled to a host 50 via wiring, such as flexible printed circuits (FPC) 45. The host 50 outputs commands relating to the operation of the viewing angle control panel 1, such as turning on/off the operation of the viewing angle control panel 1, to the drive circuit 40. The drive circuit 40 individually applies voltages to the wiring lines 121, . . . , and 12m in accordance with the commands.

The insulating layer 13 is stacked on the wiring layer 12 on the side facing the liquid crystal 30. The insulating layer 13 is made of insulating material. While the insulating material used for the insulating layer 13 is silicon monoxide (SiO), for example, it is not limited thereto and may be silicon nitride (SiN) or other insulating resins. The use of SiO for the insulating layer 13 enables adjusting the electrical resistance of the first electrode layer 14 by adjusting the amount of oxygen supplied when the insulating layer 13 is formed.

The first electrode layer 14 is stacked on the insulating layer 13 on the side facing the liquid crystal 30. The first electrode layer 14 is made of material with higher sheet resistance than the wiring layer 12. Therefore, the first electrode layer 14 functions as a high-resistance electrode. The first electrode layer 14 is made of, for example, a compound containing indium, gallium, zinc, and oxygen (IGZO), indium zinc oxide (IZO), or ITO adjusted to have higher sheet resistance than the wiring layer 12. The insulating layer 13 is interposed between the wiring layer 12 and the first electrode layer 14. In other words, the wiring layer 12 and the first electrode layer 14 are separated by the insulating layer 13.

The substrate 20 includes a second substrate 21 and a second electrode layer 22. The second substrate 21 is a light-transmitting substrate like the first substrate 11. Specifically, the second substrate 21 is a glass substrate, for example, but it may be a thin-plate substrate made of other light-transmitting materials.

The second electrode layer 22 is formed on the second substrate 21 on the side facing the liquid crystal 30. The second electrode layer 22 is made of light-transmitting conductive material. The second electrode layer 22 has lower sheet resistance than the first electrode layer 14. The light-transmitting conductive material used for the second electrode layer 22 is ITO, which is used for the wiring layer 12, for example, but it is not limited thereto and may be other light-transmitting conductive materials.

The liquid crystal 30 includes a plurality of liquid crystal molecules 31. The orientation of each of the liquid crystal molecules 31 is controlled depending on the potential difference between the electric potential of the first electrode layer 14 and the electric potential of the second electrode layer 22. The transmittance of light traveling from one side to the other in the Z-direction in the viewing angle control panel 1 corresponds to the orientation of the liquid crystal molecules 31. In other words, the light transmittance of the viewing angle control panel 1 can be controlled by controlling the potential difference between the electric potential of the first electrode layer 14 and the electric potential of the second electrode layer 22.

The electric potential of the second electrode layer 22 according to the embodiment is a fixed potential. Specifically, the electric potential of the second electrode layer 22 is the ground potential (0 V), for example, but it is not limited thereto and can be appropriately changed. Therefore, the light transmittance of the viewing angle control panel 1 is controlled by controlling the electric potential of the first electrode layer 14.

The electric potential of the first electrode layer 14 corresponds to the voltage applied to the wiring lines 121, . . . , and 12m. Therefore, when the voltages individually applied to the respective wiring lines 121, . . . , and 12m are different from each other, the electric potential of the first electrode layer 14 varies depending on the position in the X-direction.

Figure 2:
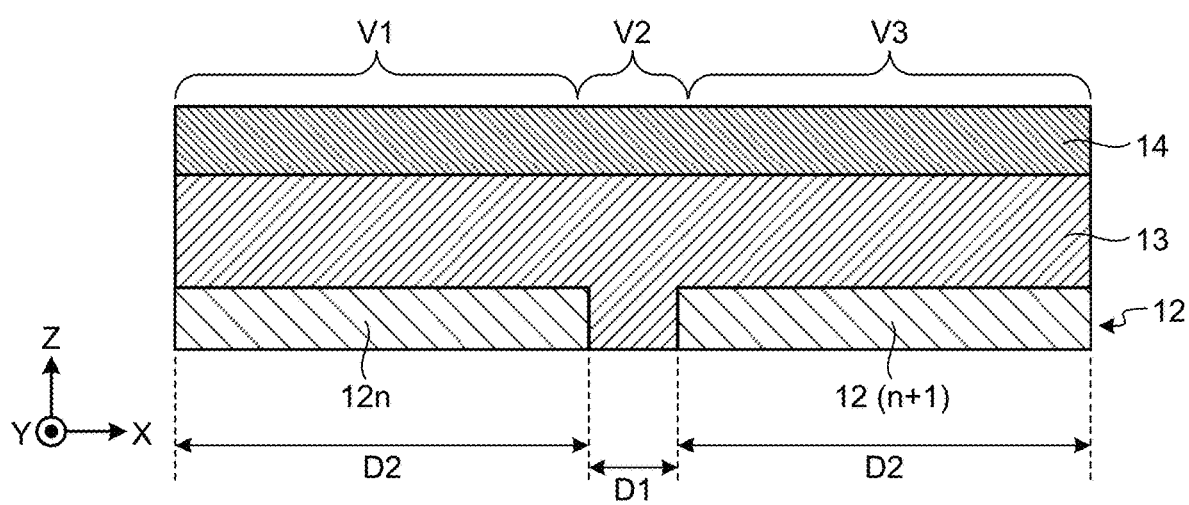
FIG. 2 is a schematic illustrating the potential difference in regions of a first electrode layer in an X-direction generated due to voltages applied to respective two wiring lines adjacently disposed in the X-direction.

FIG. 2 is a schematic illustrating the potential difference in regions of the first electrode layer 14 in the X-direction generated due to the voltages applied to a wiring line 12n and a wiring line 12(n+1) adjacently disposed in the X-direction. The wiring lines 12n and 12(n+1) are included in the wiring lines 121, . . . , and 12m. n is a natural number. (n+1) is equal to or smaller than m. When n=1 is satisfied, for example, the wiring lines 12n and 12(n+1) are the wiring lines 121 and 122, respectively.

The electric potential of the first electrode layer 14 mainly corresponds to the voltage of the wiring line facing the first electrode layer 14 in the Z-direction out of the wiring lines included in the wiring layer 12. In the example illustrated in FIG. 2, the electric potential of a region V1 of the first electrode layer 14 facing the wiring line 12n in the Z-direction corresponds to the voltage of the wiring line 12n. The electric potential of a region V3 of the first electrode layer 14 facing the wiring line 12(n+1) in the Z-direction corresponds to the voltage of the wiring line 12(n+1).

The electric potential of a non-facing region of the first electrode layer 14 not facing the wiring lines included in the wiring layer 12 in the Z-direction and a region near the non-facing region correspond to the electric potentials of the two regions facing each other in the X-direction with the non-facing region interposed therebetween. In the example illustrated in FIG. 2, a region V2 of the first electrode layer 14 positioned between the region V1 and the region V3 corresponds to the non-facing region not facing the wiring lines included in the wiring layer 12 in the Z-direction and a region near the non-facing region. The electric potential of the region V2 is an intermediate potential between the electric potentials of the regions V1 and V3.

If the sheet resistance of the first electrode layer 14 is too low, the potential difference is not generated in the regions V1, V2, and V3, and the electric potential is constant over the entire first electrode layer 14. By contrast, if the sheet resistance of the first electrode layer 14 is too high, the first electrode layer 14 functions as an insulator and is not electrically charged corresponding to the voltage applied to the wiring layer 12. The sheet resistance of the first electrode layer 14 is adjusted such that the electric potentials of the regions V1, V2, and V3 are different when the voltages of the wiring lines 12n and 12(n+1) are different.

Specifically, the sheet resistance of the wiring layer 12 and the second electrode layer 22 is approximately 100 Ω/sq. The sheet resistance of the first electrode layer 14 is approximately $10^4$ to $10^6$ Ω/sq. The resistance ratio between the sheet resistance of the first electrode layer 14 and the sheet resistance of the wiring layer 12 is preferably approximately 100:1 to 10,000:1.

The thicknesses of the wiring layer 12, the insulating layer 13, and the first electrode layer 14 in the Z-direction depend on the materials used for the wiring layer 12, the insulating layer 13, and the first electrode layer 14, respectively. In this example, the wiring layer 12 is made of ITO, the insulating layer 13 is made of SiO, and the first electrode layer 14 is made of IGZO. In this case, the thickness of the wiring layer 12 is 70 nanometers (nm), the thickness of the insulating layer 13 is 200 nm, and the thickness of the first electrode layer 14 is 50 nm. The thickness of the insulating layer 13 includes the part interposed between the wiring lines adjacently disposed in the X-direction out of the wiring lines included in the wiring layer 12. In other words, the thickness of the insulating layer 13 is the thickness between the first substrate 11 and the first electrode layer 14.

The drive circuit 40 according to the embodiment described with reference to FIG. 2 applies different voltages to the respective wiring lines 121, ..., and 12m. This configuration enables controlling the light transmittance corresponding to the difference in viewing angle between one end and the other end in the X-direction in the viewing angle control panel 1 when the viewing angle control panel 1 is viewed from a line of sight inclined in the X-direction with respect to the Z-direction.

Figure 4:
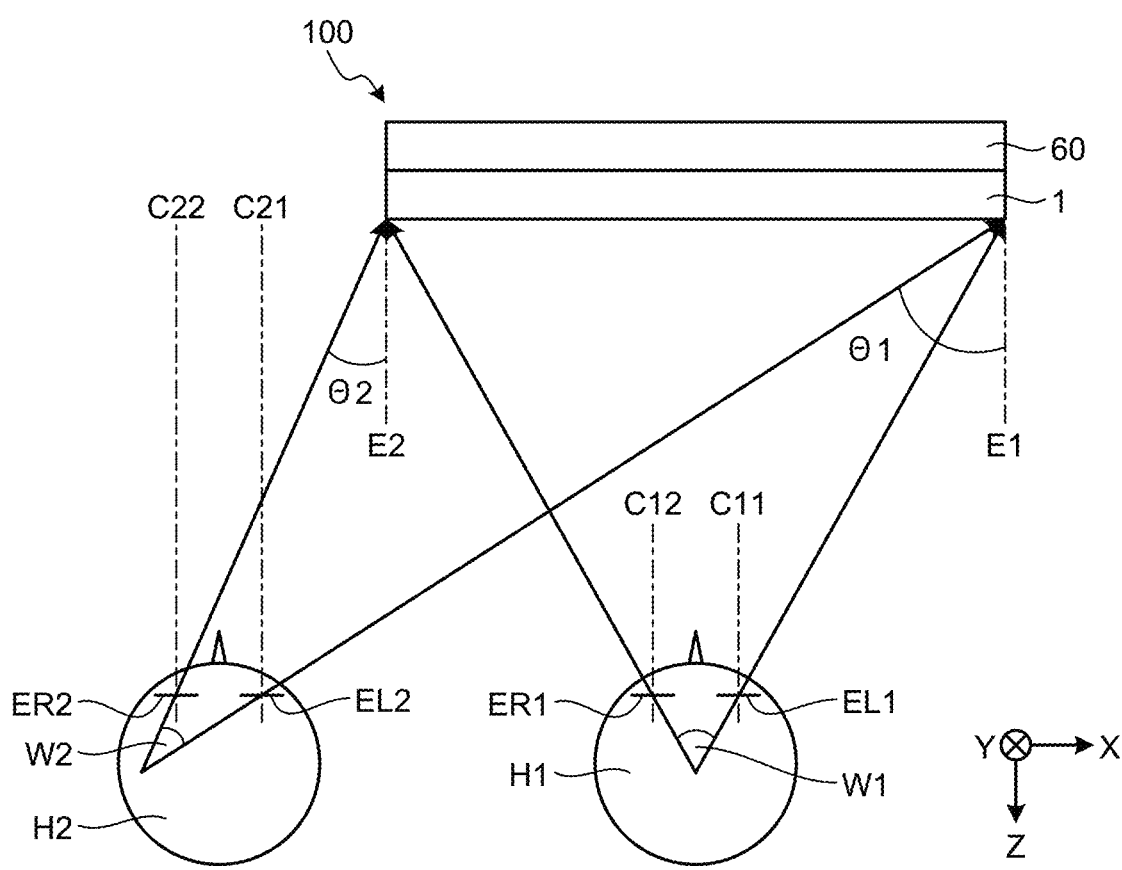
FIG. 4 is a schematic of an example of the difference in viewing angle between one end and the other end in the X-direction in the viewing angle control panel when the viewing angle control panel is viewed from a line of sight inclined in the X-direction with respect to a Z-direction.

FIG. 4 is a schematic of an example of the difference in viewing angle between one end and the other end in the X-direction in the viewing angle control panel 1 when the viewing angle control panel 1 is viewed from a line of sight inclined in the X-direction with respect to the Z-direction. FIG. 4 illustrates an example where a user H1 and a user H2 visually recognize a display image output by a display device 100 composed of a display panel 60 and the viewing angle control panel 1 stacked in the Z-direction.

The display panel 60 outputs an image. Specifically, the display panel 60 is a transmissive liquid crystal display device, for example, and outputs an image using light from a backlight provided on the side opposite to the viewing angle control panel 1 as a light source. The viewing angle control panel 1 is provided on the line of light traveling from the backlight toward the users H1 and H2 and controls the degree of transmission of light of the image output from the display panel 60 toward the users H1 and H2. While the viewing angle control panel 1 is provided at a position between the display panel 60 and the users H1 and H2, for example, it may be provided on the opposite side of the display panel 60 provided with the backlight.

A left eye EL1 and a right eye ER1 of the user H1 are positioned side by side in the X-direction. The viewing angle control panel 1 and the display panel 60 are stacked in the Z-direction on the extension lines of a line of sight C11 of the left eye EL1 along the Z-direction and a line of sight C12 of the right eye ER1 along the Z-direction. Thus, the user H1 is at a position to view the display panel 60 from the front through the viewing angle control panel 1.

By contrast, a left eye EL2 and a right eye ER2 of the user H2 are positioned side by side in the X-direction. The viewing angle control panel 1 and the display panel 60 are not positioned on the extension lines of a line of sight C21 of the left eye EL2 along the Z-direction and a line of sight C22 of the right eye ER2 along the Z-direction. Thus, the user H2 is at a position to view the display panel 60 obliquely in the X-direction through the viewing angle control panel 1.

There is a demand to enable an image output by the display panel 60 to be visually recognized by the user H1 and inhibit it from being visually recognized by the user H2. In a specific example where such a demand arises, the display panel 60 is a display device mounted on a four-wheeled vehicle, the user H2 is a driver of the four-wheeled vehicle, and the user H1 is a passenger in the passenger seat of the four-wheeled vehicle. Not limited to this specific example, there is a demand to cause an image to be visually recognized only by a person, such as the user H1, who is in front of a display device, such as the display panel 60, and inhibit the image from being visually recognized by a person, such as the user H2, who obliquely views the display device.

A field of view W1 of the user H1 extends in the X-direction so as to view the display panel 60 from the front through the viewing angle control panel 1 and has substantially no difference between the angle with respect to a first end E1 and the angle with respect to a second end E2 of both ends in the X-direction of an image display region in the display panel 60.

By contrast, a field of view W2 of the user H2 has a significant difference between an angle θ1 with respect to the first end E1 and an angle θ2 with respect to the second end E2 of both ends in the X-direction of the display panel and the viewing angle control panel 1. Specifically, the angle θ1 with respect to the first end E1 positioned relatively far from the user H2 in the X-direction is significantly larger than the angle θ2 with respect to the second end E2 positioned relatively close to the user H2 in the X-direction. If the display panel 60 has uniform light transmittance regardless of the position in the X-direction, the user H2 having such a field of view W2 cannot visually recognize an image output from the display panel 60 at the first end E1 but may possibly be able to visually recognize it at the second end E2.

Figure 5:
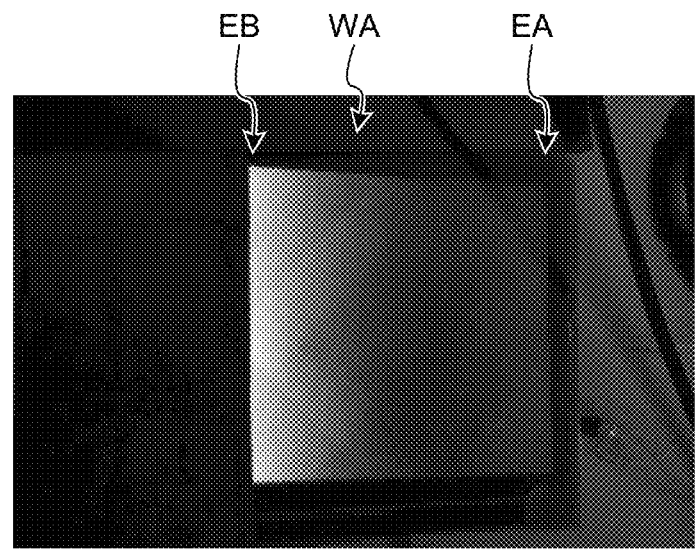
FIG. 5 is a view of a reference example where an image can be visually perceived as if the light transmittance differs between a far position and a near position in oblique view.

FIG. 5 is a view of a reference example where an image can be visually perceived as if the light transmittance differs between a far position EA and a near position EB in oblique view. In FIG. 5, the liquid crystal is supplied with a uniform voltage from the far position EA to the near position EB. Therefore, a difference in light transmittance depending on the viewing angle characteristics of the panel is apparent between the far position EA and the near position EB in oblique view. Specifically, the far position EA is relatively dark because almost no light is transmitted at the far position EA, whereas light is transmitted at the near position EB by such an amount that the near position EB appears clearly brighter than the far position EA. In this reference example, the image output from the display panel 60 is relatively likely to be visually recognized at the near position EB.

To address this, the embodiment has a mechanism to vary the light transmittance of the viewing angle control panel 1 depending on the position in the X-direction. Specifically, as described with reference to FIG. 3, the drive circuit 40 can individually apply voltages to the wiring lines 121, ..., and 12m. The drive circuit 40 applies different voltages to the respective wiring lines 121, ..., and 12m.

Figure 6:
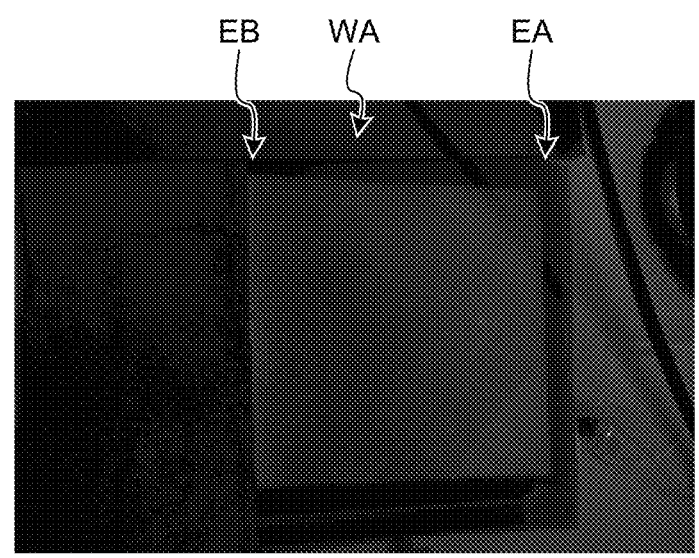
FIG. 6 is an example according to an embodiment where the light transmittance is more uniform between the far position and the near position in oblique view than in the reference example illustrated in FIG. 5.

FIG. 6 is an example according to the embodiment where the light transmittance is more uniform between the far position EA and the near position EB in oblique view than in the reference example illustrated in FIG. 5. In the embodiment, the brightness at the far position EA and the near position EB in oblique view is made more uniform than in the reference example. In other words, the far position EA and the near position EB according to the embodiment have almost no difference in light transmittance in oblique view. Therefore, the embodiment can reduce the occurrence of the state where the image output from the display panel can be visually recognized at the near position EB, which occurs in the reference example. The far position EA corresponds to the first end E1 in FIG. 4, for example. The near position EB corresponds to the second end E2 in FIG. 4, for example.

FIG. 6 illustrates an example where m=9 is satisfied in the wiring lines 121, ..., and 12m, a voltage of 3.1 volts (V) is applied to the wiring line closest to the near position EB, and voltages of 3.0 V, 2.9 V, 2.8 V, 2.8 V, 2.7 V, 2.7 V, 2.6 V, and 2.5 V are applied to the other wiring lines arrayed in order from the wiring line applied with 3.1 V toward the far position EA. When the voltages of adjacent wiring lines are different, the region facing one of the adjacent wiring lines in the first electrode layer 14 corresponds to the region V1, the region facing the other of the adjacent wiring lines corresponds to the region V3, and the region V2 between the region V1 and the region V3 has an intermediate potential between the electric potential of the region V1 and the electric potential of the region V3 as described with reference to FIG. 2. The voltage of the second electrode layer 22 is 0 V.

To control the light transmittance, the image display region in the display panel 60, that is, the region covering from the first end E1 to the second end E2 serves as the viewing angle control region of the viewing angle control panel 1 as described with reference to FIG. 6. In other words, the first electrode layer 14 is provided in the region covering from the first end E1 to the second end E2, and the wiring lines 121, ..., and 12m are disposed facing the first electrode layer 14.

The liquid crystal 30 employs what is called a twisted nematic (TN) system and is controlled so as to achieve light distribution corresponding to the potential difference between the first electrode layer 14 and the second electrode layer 22. Although not illustrated in FIG. 1 and other figures, orientation films (e.g., polyimide layers) that define the initial orientation of the liquid crystal molecules 31 are formed on the first electrode layer 14 on the side facing the liquid crystal 30 and on the second electrode layer 22 on the side facing the liquid crystal 30. The orientation films are provided to achieve, for example, what is called a normally white mode in which the degree of the light transmittance of the viewing angle control panel 1 is maximized in initial orientation of the liquid crystal molecules 31 with no electric field formed between the first electrode layer 14 and the second electrode layer 22. The orientation films may be provided to achieve what is called a normally black mode in which the degree of the light transmittance of the viewing angle control panel 1 is minimized in initial orientation of the liquid crystal molecules 31 with no electric field formed between the first electrode layer 14 and the second electrode layer 22.

As described above, the viewing angle control panel 1 serving as a liquid crystal panel according to the embodiment includes the first substrate 11, the second substrate 21, the wiring layer 12, the insulating layer 13, the first electrode layer 14, and the second electrode layer 22. The first substrate 11 is a light-transmitting substrate. The second substrate 21 is disposed facing the first substrate 11 with the liquid crystal 30 interposed therebetween and is a light-transmitting substrate. The wiring layer 12 is provided on the first substrate 11 on the side facing the liquid crystal 30 and includes a plurality of wiring lines arrayed in the X-direction. The insulating layer 13 is stacked on the wiring layer 12 on the side facing the liquid crystal 30. The first electrode layer 14 is stacked on the insulating layer 13 on the side facing the liquid crystal 30. The second electrode layer 22 is provided on the second substrate 21 on the side facing the liquid crystal 30. The sheet resistance of the first electrode layer 14 is higher than that of the wiring layer 12 and that of the second electrode layer 22. This configuration can form an electric field in the first electrode layer 14 in which the electric potential is gradually increased or decreased from one side to the other along an array direction of the wiring lines included in the wiring layer 12. If a user (e.g., the user H2) obliquely views an image output from a display panel (e.g., the display panel 60) through the viewing angle control panel 1, the viewing angle control panel 1 can form a difference in light transmittance between a relatively near end (e.g., the second end E2) and a relatively far end (e.g., the first end E1) from the user, which corresponds to the difference in viewing angle from the user in the array direction. Therefore, the viewing angle control panel 1 can more reliably inhibit an image from being visually recognized from an oblique viewpoint.

The wiring layer 12 and the first electrode layer 14 are separated by the insulating layer 13, and each of the wiring layer 12, the first electrode layer 14, and the second electrode layer 22 is a light-transmitting layer. This configuration enables the first electrode layer 14 to more reliably form an intermediate potential between two wiring lines adjacently disposed in the array direction (X-direction) of the wiring lines included in the wiring layer 12. Since each of the wiring layer 12, the first electrode layer 14, and the second electrode layer 22 is a light-transmitting layer, it is possible to further enhance the visibility of the image to a user (e.g., the user H1) who views the image output from the display panel (e.g., the display panel 60) from the front through the viewing angle control panel 1.

The viewing angle control panel 1 also includes a drive circuit 40 capable of individually applying voltages to the wiring lines included in the wiring layer 12. This configuration can facilitate voltage control for gradually increasing or decreasing the voltage applied to the wiring lines from one end to the other in the array direction of the wiring lines.

The display device 100 includes the display panel 60 and the viewing angle control panel 1. The display panel displays an image. The viewing angle control panel 1 is stacked on the display surface of the display panel 60. The display device 100 can more reliably inhibit an image from being visually recognized from an oblique viewpoint.

Modification

The specific aspect of the liquid crystal panel functioning as the viewing angle control panel according to the embodiment is not limited to the viewing angle control panel 1 described with reference to FIG. 1. The following describes a modification of the liquid crystal panel functioning as the viewing angle control panel with reference to FIG. 7. In the description of the modification, components similar to those according to the embodiment are denoted by the same reference numerals, and explanation thereof may be omitted.

Figure 7:
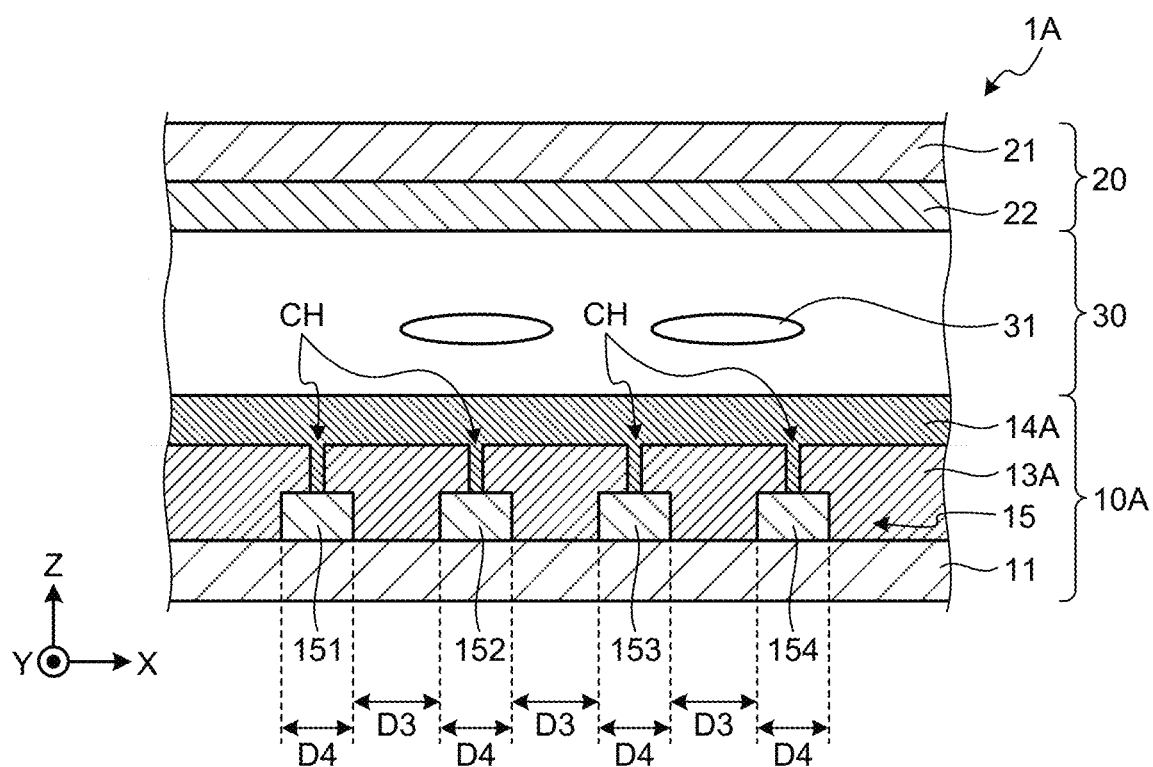
FIG. 7 is a schematic sectional view of the main configuration of the viewing angle control panel.

FIG. 7 is a schematic sectional view of the main configuration of a viewing angle control panel 1A. The viewing angle control panel 1A includes a substrate 10A instead of the substrate 10 of the viewing angle control panel 1 described with reference to FIG. 1. The substrate includes the first substrate 11, a wiring layer 15, an insulating layer 13A, and a first electrode layer 14A.

The wiring layer 15 in the viewing angle control panel 1A is provided instead of the wiring layer 12 in the viewing angle control panel 1. The wiring layer 15 is formed on the first substrate 11 on the side facing the liquid crystal 30. The wiring layer 15 may be made of light-transmitting conductive material or non-light-transmitting conductive material, what is called metal wiring, with a lower sheet resistance than the wiring layer 12. While the light-transmitting conductive material used for the wiring layer 15 is copper, for example, it is not limited thereto and may be other conductive materials.

Similarly to the wiring layer 12, the wiring layer 15 includes a plurality of wiring lines arrayed in the X-direction. In FIG. 7, wiring lines 151, 152, 153, and 154 arrayed from one side to the other in the X-direction are illustrated as the wiring lines. Similarly to the wiring lines 121, . . . , and 12m included in the wiring layer 12 in the viewing angle control panel 1, the wiring lines included in the wiring layer 15 in the viewing angle control panel 1A can be represented as wiring lines 151, . . . , and 15m. The wiring lines 151, 152, 153, and 154 illustrated in FIG. 7 are an example of the wiring lines when m=4 is satisfied.

The wiring lines included in the wiring layer 15 are individually coupled to the drive circuit 40 similarly to the wiring lines 121, . . . , and 12m described with reference to FIG. 3. The drive circuit 40 individually applies voltages to the wiring lines included in the wiring layer 15. The insulating layer 13A is interposed between the wiring lines adjacently disposed in the X-direction out of the wiring lines included in the wiring layer 15. Different wiring lines of the wiring lines included in the wiring layer 15 are insulated in the X-direction by the insulating layer 13A and do not short-circuit.

The insulating layer 13A is stacked on the wiring layer 15 on the side facing the liquid crystal 30. The insulating layer 13A has contact holes CH at the positions in contact with the respective wiring lines (e.g., the wiring lines 151, 152, 153, and 154) included in the wiring layer 15 in the Z-direction as illustrated in FIG. 7. The contact hole CH is a hole passing through the insulating layer 13A in the Z-direction. The first electrode layer 14A enters into the contact holes CH. Except for the above noted items, the insulating layer 13A is the same as the insulating layer 13.

The first electrode layer 14A is stacked on the insulating layer 13A on the side facing the liquid crystal 30. The first electrode layer 14A entering into the contact holes CH is in contact with the wiring lines included in the wiring layer 15. Except for the above noted items, the first electrode layer 14A is the same as the first electrode layer 14.

The following describes a case where the arrangement pitch composed of a space D3 and a width D4 in the X-direction of the wiring lines included in the wiring layer 15 in the viewing angle control panel 1A is equal to the arrangement pitch composed of the space D1 and the width D2 in the X-direction of the wiring lines included in the wiring layer 12 in the viewing angle control panel 1. The space D3 in the X-direction where the insulating layer 13A is interposed between the wiring lines adjacently disposed in the X-direction out of the wiring lines included in the wiring layer 15 is larger than the space D1. By contrast, the width D4 in the X-direction of each of the wiring lines included in the wiring layer 15 is smaller than the width D2. This is because the contact holes CH allow the first electrode layer 14A to be in contact with the wiring layer and the electric potential of the first electrode layer 14A can be controlled so as to establish the relation of the regions V1, V2, and V3 described with reference to FIG. 2 if the width D4 is smaller than the width D2. Therefore, if the wiring layer 15 is made of a non-light-transmitting conductive material, the viewing angle control panel 1A as a whole can exhibit such light transmittance property that causes substantially no problem in transmitting an image output from the display panel 60 described with reference to FIG. 4. The modification can make the space D3 larger than the width D4.

In the modification, the first electrode layer 14A and the wiring layer 15 are provided such that the difference in sheet resistance between the first electrode layer 14A and the wiring layer 15 is approximately 100:1. Except for the above noted items, the viewing angle control panel 1A is the same as the viewing angle control panel 1.

The viewing angle control panel 1A is disposed between the backlight and the user (e.g., the users H1 and H2) instead of the viewing angle control panel 1 described with reference to FIG. 4. The modification can achieve the same advantageous effects as those according to the embodiment. In addition, the wiring lines included in the wiring layer can be made thinner because the wiring layer 15 is in contact with the first electrode layer 14A through the contact holes CH formed in the insulating layer 13A. Therefore, the wiring layer 15 can be made of non-light-transmitting material with higher conductivity and can further improve the power efficiency.

While the liquid crystal 30 according to the embodiment and the modification described above is a TN liquid crystal, the viewing angle control panels 1 and 1A according to the present disclosure are not limited to TN liquid crystal panels. Any liquid crystal panel with a vertical electric field system can be employed as a light control panel, such as the viewing angle control panels 1 and 1A.

The display panel 60 provided on the opposite side of the user (users H1 and H2) who views an image across the viewing angle control panels 1 and 1A is not limited to a liquid crystal panel. The display panel 60 may be a self-luminous display panel, such as an organic light-emitting diode (OLED) panel.

Out of other advantageous effects achieved by the aspects described in the present embodiment, advantageous effects clearly defined by the description in the present specification or appropriately conceivable by those skilled in the art are naturally achieved by the present disclosure.

What is claimed is:

1. A liquid crystal panel comprising:
    a first substrate that is a light-transmitting substrate;
    a second substrate that is disposed facing the first substrate with a liquid crystal interposed between the first substrate and the second substrate and is a light-transmitting substrate;
    a wiring layer provided on the first substrate on a side facing the liquid crystal and comprising a plurality of wiring lines arrayed in a predetermined direction;
    an insulating layer stacked on the wiring layer on a side facing the liquid crystal;
    a first electrode layer stacked on the insulating layer on a side facing the liquid crystal; and
    a second electrode layer provided on the second substrate on a side facing the liquid crystal, wherein
    a sheet resistance of the first electrode layer is higher than a sheet resistance of the wiring layer and a sheet resistance of the second electrode layer, and
    the wiring layer and the first electrode layer are not electrically connected.

2. The liquid crystal panel according to claim 1, wherein
    the wiring layer and the first electrode layer are separated by the insulating layer, and
    each of the wiring layer, the first electrode layer, and the second electrode layer is a light-transmitting layer.

3. The liquid crystal panel according to claim 1, wherein a polyimide layer is stacked on each of the first electrode layer on a side facing the liquid crystal and the second electrode layer on a side facing the liquid crystal.

4. The liquid crystal panel according to claim 1, further comprising a drive circuit capable of individually applying voltages to the wiring lines.

5. A display device comprising:
    a display panel configured to display an image: and
    the liquid crystal panel according to claim 1 stacked on a display surface of the display panel.

* * * * *